(No Model.) 2 Sheets—Sheet 1.
C. VATTIER.
FURNACE FOR ROASTING DUST OF COPPER AND OTHER ORES.
No. 511,476. Patented Dec. 26, 1893.
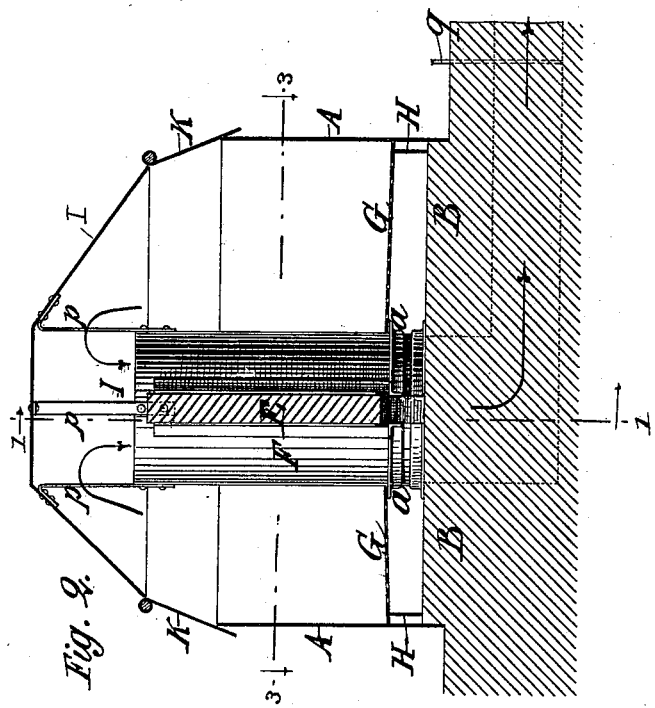
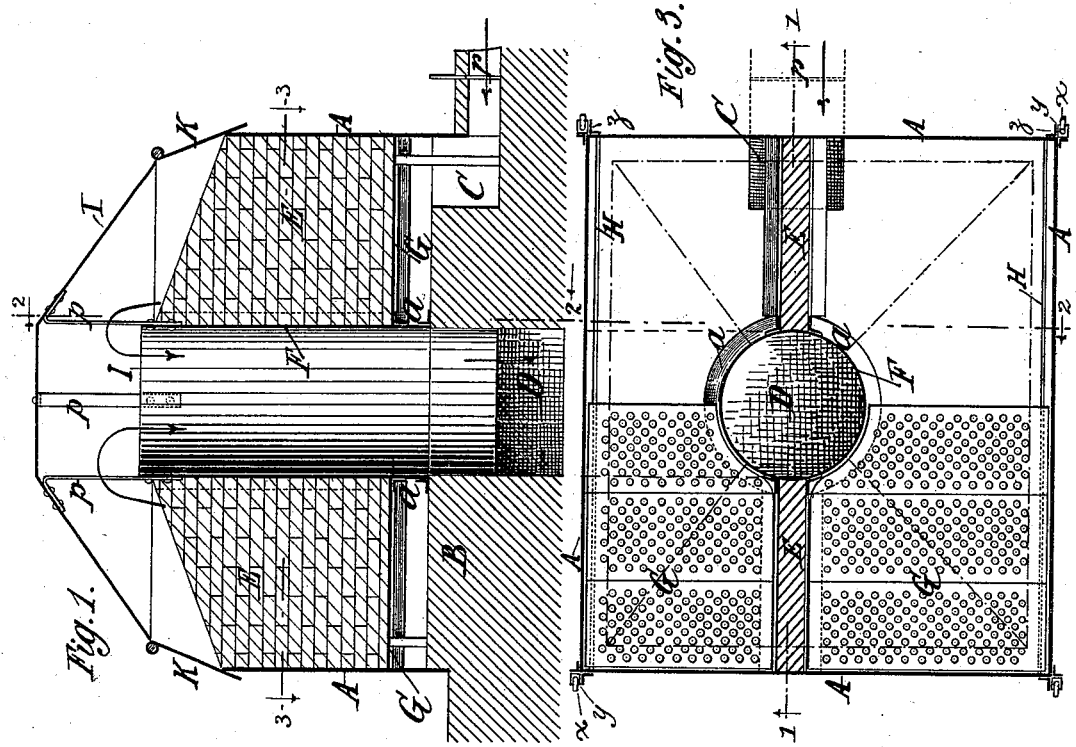
WITNESSES
Fred White
C. K. Fraser.
INVENTOR:
Charles Vattier,
By his Attorneys
Arthur C. Fraser & Co.

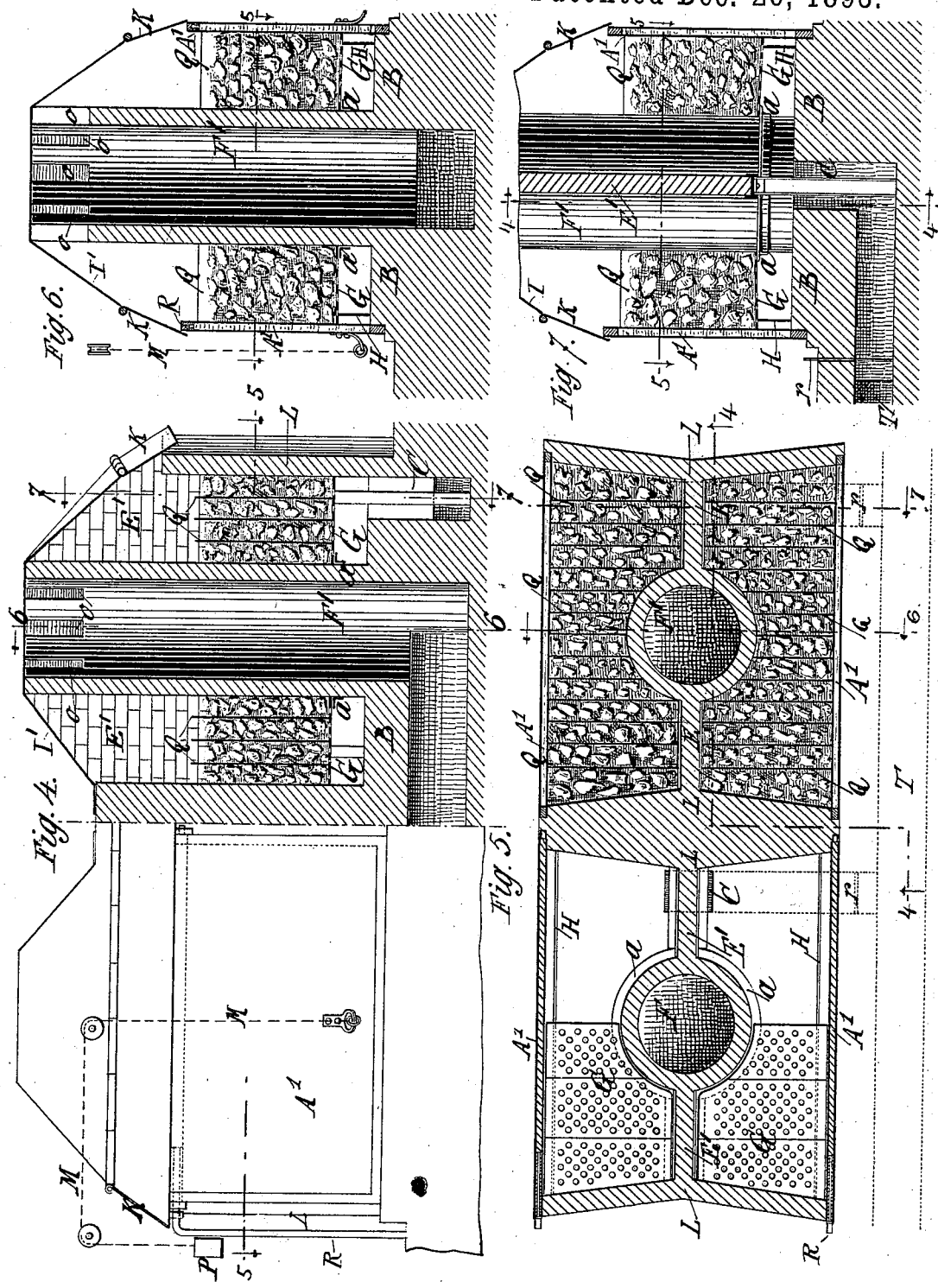

UNITED STATES PATENT OFFICE.

CHARLES VATTIER, OF PARIS, FRANCE.

FURNACE FOR ROASTING DUST OF COPPER AND OTHER ORES.

SPECIFICATION forming part of Letters Patent No. 511,476, dated December 26, 1893.

Application filed March 6, 1893. Serial No. 464,901. (No model.)

*To all whom it may concern:*

Be it known that I, CHARLES VATTIER, engineer, of 23 Boulevard de Strasbourg, Paris, France, have invented a certain new and useful Furnace for Roasting Dust of Copper and other Ores; and I do hereby declare that the following is a full, clear, and exact description of the same.

Hitherto the roasting of ore dust has presented great difficulties occasioning large expenditure for small results, requiring special skill on the part of the foreman and workmen engaged on the operations and furnishing only products of irregular quality for metallurgical treatment. In order to attain some degree of perfection recourse must be had to very large reverberatory furnaces or to special furnaces. In the case of reverberatory furnaces, which in fact extract all but two or even one per cent. of the sulphur, there are required a large expenditure of fuel and great skill and activity on the part of the workmen and the output is nevertheless only moderate. Besides as the gases contain little sulphurous acid, they cannot be used for the manufacture of sulphuric acid. In the case of shelf and other furnaces, there is less consumption of fuel, the sulphurous acid can be utilized, and the roasting is very perfect, but the cost of manipulation is great, the construction of the apparatus is difficult, complicated and such as to require frequent repair, and finally the output is very small for a plant so large. These processes must therefore be abandoned when the production has to be rapid, when workmanship is costly and especially when the metallurgical establishments are situated in districts where all the industrial conditions present great difficulties. Already recourse has been had to the following expedient: The ore dust arriving directly from the mines or from the screening of blocks of various sizes was moistened with clay water and formed into small bricks which were left to dry in the open air. These bricks, when dried, were roasted in heaps. The progress of the roasting had to be carefully watched, closing or opening the flues according to the condition, the covers had often to be repaired, and all the known inconveniences of roasting in heaps had to be undergone. As many of the bricks were broken they had to be made again by moistening, forming again into bricks, drying them in the open air, and when dried, conveying them again to the muffle. Dust was formed during their transport. Moreover, as the roasting was very imperfect, the first melt of copper pyrites could only produce a matte of very low grade in respect of copper. The roasting being bad, naturally little iron oxide is formed and consequently this in melting being insufficient to saturate the contained quartz so as to produce slags not containing more than fifty per cent. of silica, it was necessary to add to the charge up to fifteen per cent. of the ore, carbonate of lime and a large proportion of basic slags resulting from other metallurgical operations (working of the converters) of the establishment. It was only after these additions that slags could be got sufficiently fluid. On account of the slow working of the muffle the output from each furnace was very small. Another cause of expense was the rapid wasting of the iron rakes with which the roasted dust was stirred when moist, which is explained by the presence of a certain quantity of sulphate of copper formed during the roasting.

It is for the purpose of obviating all these inconveniences that I have formed the idea of employing compressed air, and devoted myself to experiments undertaken in this direction. As air when forced tends to follow the walls, that is to say the circumference of the apparatus, this could only have a very small diameter; otherwise the central part would remain crude; on the other hand for a like reason the dust could only be charged in small thickness. Thus only small quantity of ore could be calcined in each apparatus, and that very imperfectly. But besides difficulties in carrying on the operations, manipulation, expenditure of fuel, escape of gas, &c., the chief inconvenience was the following: The gases reaching the walls of the apparatus at the beginning, a very vivid combination of the pyrites near the walls took place, and the mass became scarified while the center remained unaffected. Shortly a single block became formed and the operation had to be stopped. The difficulty was to remove this block from the apparatus already worn and eaten into by the combustion gases, and recourse had to be had to wedges, levers, pinchers, &c.; and after a few operations the apparatus was quite unfit for use even if its construction were attempted in pieces quite separable. Turning my attention to remedies for these inconveniences, I have endeavored to obtain a diffusion as uniform as possible of the gases in the whole mass treated by arranging a partitioning within it so as to form in the furnace separate fractional spaces through which the gases circulate so as to act as uniformly as possible on all the mass. To attain this result, I arrange the apparatus as I shall describe referring to the accompanying drawings in which—

Figure 1 is a vertical longitudinal mid-section of a furnace constructed according to one form of my invention, the view being cut on the line 1—1 in Figs. 2 and 3 and looking in the direction of the arrows. Fig. 2 is a vertical transverse section thereof cut on the lines 2—2 in Figs. 1 and 3 and looking in the direction of the arrows. Fig. 3 is a horizontal section thereof cut on the lines 3—3 in Figs. 1 and 2 and looking in the direction of the arrows, the perforated plates being removed from the right-hand side of the furnace. Fig. 4 is a side elevation partly in vertical section cut on the line 4—4 in Figs. 5, 6 and 7 and looking in the direction of the arrows, showing a furnace constructed according to another form of my invention. Fig. 5 is a horizontal section thereof cut on the lines 5—5 in Figs. 4, 6 and 7 and looking in the direction of the arrows, the right-hand furnace being shown as charged, and the left-hand furnace shown as empty and with part of the perforated plates removed. Fig. 6 is a vertical transverse mid-section of the right-hand furnace shown in Figs. 4 and 5, the view being cut on the lines 6—6 in said figures and looking in the direction of the arrows; and Fig. 7 is a vertical cross-section of the right-hand furnace shown in Figs. 4 and 5, cut on the line 7—7 in said figures and looking in the direction of the arrows.

Referring first to the construction shown in Figs. 1, 2 and 3, the furnace consists of a quadrangular iron casing formed by four plates A resting freely on a well stamped concrete floor B, which projects beyond the sides of the casing and is raised 0.10 meters above the surrounding ground, having through it a passage C for the compressed air from a fan; at its center it has an opening D communicating with a flue which leads the fumes to the principal flues connected to the great chimney of the establishment. The dimensions of the casing may be varied. Suitable dimensions are: length, 2.40 meters; breadth, 2.20 meters; height, 0.90 meters. Each of the plates A is fastened to the next by removable keys $x$ which are pushed into iron lugs $y$ fixed to the other plate. Each of the plates A is terminated on three sides by an angle iron $z$ having some holes and connected by a simple bent iron entering these holes. At the distance of a meter from one of the small sides commences internally a small bird's wall E adjusted by trough shaped irons, dividing the casing longitudinally into two almost equal parts. This wall does not rest directly upon the floor, but it rests at a distance of say .30 meters upon trough shaped irons $a$ connected to the central sheet iron chimney F. These irons also form horizontal projection which serve as support to one of the sides of the double bottom G composed of pieces of sheet iron irregularly perforated. This bottom G is carried at about .30 meters from the floor in the longitudinal direction upon the projection beyond the wall, and the sheet iron tube F, and in the transverse direction upon a bar of iron H placed directly on the floor. The air is introduced by the conduit C into the double bottom, expanding itself in this bottom and traversing under all the perforated plates G. Four iron lugs P support a conical roof I of sheet iron, the fixed edges of which are situated at about .5 meters above the level of the upper edges of the casing and slightly receding. The division wall inclines in the longitudinal direction from each of the smaller sides up to the central pipe at the level of the fixed edges of the roof. On each of the edges of the roof is fixed a hinged sheet iron plate K, so as to be capable of being raised or lowered at will. In the latter case when all the sheets are lowered there is no communication between the apparatus and the surrounding atmosphere and the whole of the gases escape from the central chimney F. An admission valve $r$ for the air of the fan allows the air supply to be regulated, and a damper $q$ placed in the discharge flue of the gas regulates the strength of the draft.

The mode of operating and the action of the apparatus are as follows:—The iron plates of the apparatus being once placed in position and keyed, the double bottom is formed by simply placing upon the trough shaped irons which pass along the wall and surround the central chimney pieces of perforated sheet iron which, at the other edge, simply rest upon the piece of iron H placed upon the floor. On these perforated plates are then placed portions of old sacks which are covered with branches, twigs, waste pieces of wood, &c., and upon this the charge of material is placed. In the first instance care is taken to make a mixture of crude material with a strong proportion of roasted material in form of powder resulting from the preceding operations of the same apparatus (débris resulting from the disintegration of the blocks) or coming from the outer layer of the heap of roasted small ore. In place of roasted ore, fragments of crude pyrites may be mixed with fragments of ores poor in sulphur and containing a large proportion of quartz, such as those coming from the residues of the washing of the earths of the furnaces and the converters. A thick mud is made of this mixture which is charged on to the sides and against the wall. At the center the larger pieces are placed and at the sides the smaller pieces. At distances apart are placed small horizontal circular pieces of wood. As soon as the layer has attained a moderate height the branches are ignited and the blowing fan is set in motion so as to act first with a very slight pressure (about three-fourths of a centimeter of mercury) and increasing the pressure up to two centimeters of mercury. The casings are then completely filled up to the top and the material is then raised at a slight incline up to the central wall so as to increase the charge as much as possible. Care must be taken during the whole time of charging to cause mud, containing a small proportion of pyrites, to flow against the iron sides of the apparatus, and the operation is terminated by covering with a thick mud the whole surface of the charge which is stamped down with a stamper. During these operations, in order to prevent the fumes given off from annoying the operators, only sufficient openings are uncovered to allow of the charging, the other sheet iron flaps being left closed. After from three to four hours the charging operation is completed and it then only remains to watch the action. Every time that an incandescent place shows itself in the charge from which a blue flame issues such place is filled with the thick mud having a small amount of pyrites which is always kept prepared ready at hand, or in other words the rising of the fire is prevented as much as possible. As soon as the active combustion is finished the operation is allowed to complete itself and the mass is cooled. At the end of about sixteen hours after the commencement of the charging the removal of the charge may be effected. For this purpose the keys which hold the iron plates are removed, as are also such plates, and by means of tongs acting as a lever the two formed blocks, which readily detach themselves are made to fall out of the apparatus. Water is then thrown on these blocks and by means of the blows of a hammer the large block is readily broken up into pieces of the desired size for introducing into the muffle furnace. The powder which results from such breaking is placed on one side for being used, as above described, in the next operation.

The small ores actually treated coming from the copper mines of "Las Condes" (of Messrs. Elguin and of the Compagnie d'Exploitation des Beonces) are composed of copper and iron pyrites with a quartz gangue containing from eighteen to twenty per cent. of copper, from twenty to thirty per cent. of sulphur and about eighteen to twenty per cent. of quartz, the remainder being arsenical iron.

The mattes produced by the direct smelting of the roasted ores in the apparatus give from fifty-two to fifty-five per cent. of copper, and this percentage may be considerably increased, but this would not be advantageous on account of the losses in copper which would result in the slags of the casting. It is even necessary to add to the charge of the muffle furnace a certain quantity of crude pyrites for reducing the percentage of copper of the mattes coming from the smelting of these ores treated by my process.

By conducting the roasting with the necessary precautions, a spongy blackish and very light mass is produced consisting of copper oxide containing hardly any sulphur.

In this apparatus may be roasted white mattes (seventy per cent. of copper) coming from the converters, and previously ground to powder and granules and mixed with small ore being the residues of the washed earths, or with débris from the furnace, &c. In melting down in the muffle furnaces these roasted white mattes (which thus regain the necessary cohesion) there is obtained directly without admixture of oxidized ore, very fine metallic copper, and, of course, a certain proportion of white mattes collected outside the molds of the copper bars. Thus the simple and single roasting in the said apparatus can replace the roastings with two, three and even four fires which it is necessary to apply to the mattes in certain cases. The operation is of the simplest, and does not require special operatives; the apparatus can be worked during the worst weather without fear of interruption. No sulphate of copper is formed which could as in the other methods of roasting, be carried along by the water, causing considerable losses of copper and attacking all the iron tools. The chemical reactions produced allow of the obtaining, without the least addition of oxidized copper ores, directly from a first smelting, mattes having a yield of fifty per cent., and, if desired, much higher. As the physical condition of the mass produced during the roasting fulfills the best conditions as to porosity and cohesion, a quantity thereof can be melted down in twenty-four hours in a muffle furnace which is equal to double that melted by the existing processes.

Figs. 4, 5, 6 and 7 show a modification of the above described apparatus. The small sides L of the apparatus instead of being of movable sheet metal are of brickwork, forming a fixed wall. The brick wall E forming the longitudinal partition is extended along the entire length, connecting the two lateral walls L L of the small sides, and above these it divides the apparatus completely in two by being extended up to the roof. Of course the lower communication of the double bottom remains open along the entire length. The admission of air is effected at the middle of the apparatus at C. The hinged sheet metal flaps K partly resting on the side walls, allow of a more complete closing during the operation. Each compartment has no longer a rectangular form, but that of a trapezium, the larger side of which is the outer one; by this means the discharge of the blocks will be much more easy, and being raised up, their removal is further facilitated. The central chimney F' is of brickwork and has side openings o near the top. The movable outer sides A' A' are each made with two metal sheets connected together and forming a jacket two centimeters in thickness, through which cold water from the pipes R is made to circulate, which is discharged when the contents of the furnace are removed, the circulation being re-established when the apparatus is put in operation again. By this circulation of water the sheet iron sides are protected from injury.

As shown on the drawings, two or more apparatuses may be combined with each other. They have one side wall in common, which walls thus have the form of a parallelogram, and the air supply is distributed to the two apparatuses by means of a lateral pipe T, embedded in the ground and provided with distributing valves. Chains M with counterweights P fixed to the walls allow of the ready raising to a certain height of the two reservoirs of sheet iron forming the external sides and of thus leaving a free space during the discharging of the furnace. With a double apparatus arranged in this way there will be no stoppage of the process; the one apparatus is in operation while the other is cooling, discharging and recharging, so that a great saving of time and labor is thus effected.

For special roasting operations requiring a very perfect treatment, there are introduced into the compartments movable partitions Q formed of old sheet iron coated with clay, for insuring the perfect diffusion of the gases throughout the mass.

When the ores to be roasted contain very little sulphur and other combustible matter, coke, coal or other fuel can be readily added for producing the necessary reactions, and steam or other gases may also be introduced in place of or together with air, for facilitating special reactions. Lastly the gases given off can readily be collected on issuing from the central chimney and be conducted either to lead chambers for the manufacture of sulphuric acid, or into any other apparatus. The admission of air can always be so regulated as to produce any desired compositions of gases. With this arrangement as with the preceding one the air pressure required is very slight. The quantity of air supplied is as small as possible, so that the sulphurous acid fumes can be utilized for the manufacture of sulphuric acid.

The principal applications of the above described process are as follows: first, the roasting of small sulphurous ores of copper, lead, silver, and other metals (contained in pyrites gangues); second, the roasting of mattes of copper, lead, silver, speiss and other intermediate sulphurous arsenical or antimonical products of metallurgy; third, the roasting of auriferous iron pyrites; fourth, the roasting of iron pyrites for extracting sulphurous acid serving for the manufacture of sulphuric acid, and oxide of iron; fifth, the roasting of bituminous schists containing copper or other substances; sixth, the roasting of all other pulverulent substances for which it is desired to use small coal or coke as fuel; lastly, for industrial applications for which under analogous conditions it is desired to realize the greatest advantage as to simplicity and economy in roasting or otherwise producing reactions between gases or vapors and solid bodies, either in granular or pulverulent form.

What I claim, and desire to secure by Letters Patent, is—

1. The improved furnace for roasting ores and similar substances comprising an ore chamber having a perforated bottom, an air space below said bottom and communicating with said chamber through the perforations of the bottom thereof, an air exhaust communicating with said chamber, and a movable outer wall for said chamber constituting an entire side thereof, whereby by moving said wall the charge of the furnace is entirely exposed and can be withdrawn, substantially as and for the purpose set forth.

2. The improved furnace for roasting ores and similar substances, comprising an ore chamber having air inlet and outlet flues, and a movable wall A' for said chamber, having a hollow interior, and pipes for supplying water to the interior of said wall for cooling it, substantially as and for the purpose set forth.

3. The improved furnace for roasting ores and similar substances, comprising two ore chambers having perforated bottoms, a dividing wall between said chambers, an air chamber beneath said ore chambers and communicating with both through the perforations of their bottoms, an air-pipe communicating with said air-chamber, a chimney F' between said ore-chambers disposed at the middle of, and constituting part of said wall, and leading downward from above said ore-chambers to below said air-chamber, and an outlet flue below and communicating with said ore-chambers through said chimney, substantially as and for the purpose set forth.

4. An improved furnace for roasting ores and similar substances, comprising an ore chamber having a perforated bottom, and a plurality of vertical partitions rising from said bottom through the charge, an air chamber beneath said ore chamber and in communication therewith through the perforations of the bottom thereof, means for supplying air to said air chamber, and means for removing air from said ore chamber beyond the charge thereof, whereby the charge is subdivided vertically by said internal partitions, substantially as and for the purpose set forth.

5. The improved furnace for roasting ores and the like, comprising two ore-chambers, a wall E' between them, a chimney F' at the middle of said wall, an air-chamber below and communicating with each of said ore-chambers, perforated plates G at bottom of the latter, an air flue C leading to said air-chamber, an air outlet flue below the latter and communicating with said chimney, side and end walls for the furnace, a top-wall I supported by said chimney, and doors K hinged to said top wall I above said chambers, all substantially as and for the purpose set forth.

In witness whereof I have hereunto signed my name in the presence of two subscribing witnesses.

CHARLES VATTIER.

Witnesses:
LOUIS A. PELATAU,
AUGUSTE MATHIEU.